US010263297B2

(12) United States Patent
Maxwell

(10) Patent No.: US 10,263,297 B2
(45) Date of Patent: Apr. 16, 2019

(54) CONTROL SYSTEM FOR A BATTERY

(71) Applicant: The Boeing Company, Chicago, IL (US)

(72) Inventor: Scott Douglas Maxwell, Renton, WA (US)

(73) Assignee: The Boeing Company, Chicago, IL (US)

( * ) Notice: Subject to any disclaimer, the term of this patent is extended or adjusted under 35 U.S.C. 154(b) by 892 days.

(21) Appl. No.: 14/258,280

(22) Filed: Apr. 22, 2014

(65) Prior Publication Data

US 2015/0303527 A1    Oct. 22, 2015

(51) Int. Cl.
| | |
|---|---|
| *H01M 2/10* | (2006.01) |
| *H01M 2/12* | (2006.01) |
| *H01M 2/20* | (2006.01) |
| *H01M 2/24* | (2006.01) |
| *H01M 10/42* | (2006.01) |
| *H01M 10/44* | (2006.01) |

(Continued)

(52) U.S. Cl.
CPC ..... *H01M 10/4257* (2013.01); *H01M 2/1077* (2013.01); *H01M 2/1241* (2013.01); *H01M 10/441* (2013.01); *H01M 10/482* (2013.01); *H01M 10/486* (2013.01); *H01M 10/613* (2015.04); *H01M 10/625* (2015.04); *H01M 10/647* (2015.04); *H01M 10/6557* (2015.04); *H01M 10/6563* (2015.04); *H02J 7/0016* (2013.01); *H02J 7/0045* (2013.01); *H02J 7/0063* (2013.01); *H01M 2/20* (2013.01); *H01M 2/24* (2013.01); *H01M 2010/4271* (2013.01)

(58) Field of Classification Search
CPC ............. H01M 10/655; H01M 2/0242–2/0245
See application file for complete search history.

(56) References Cited

U.S. PATENT DOCUMENTS

| 8,563,159 B2 | 10/2013 | Meehan | |
|---|---|---|---|
| 2011/0151314 A1* | 6/2011 | Ogawa | ................ H01M 2/1077 429/158 |

(Continued)

FOREIGN PATENT DOCUMENTS

| CN | 102468463 A | 5/2012 |
|---|---|---|
| CN | 103548234 A | 1/2014 |

(Continued)

OTHER PUBLICATIONS

Extended European Search Report, dated Aug. 19, 2015, regarding Application No. EP15155118.1, 7 pages.

(Continued)

*Primary Examiner* — Maria Laios
(74) *Attorney, Agent, or Firm* — Yee & Associates, P.C.

(57) ABSTRACT

A method and apparatus for operating a battery system. The apparatus comprises a housing, a plurality of battery cells, and a bypass circuit. The plurality of battery cells is connected in a series circuit within the housing. The plurality of battery cells is configured to supply a total voltage output. The bypass circuit is configured to determine whether a voltage output from a battery cell in the plurality of battery cells has fallen below a selected threshold. The bypass circuit is further configured to bypass the battery cell in the series circuit in response to a determination that the voltage output from the battery cell has fallen below the selected threshold.

19 Claims, 15 Drawing Sheets

(51) Int. Cl.
*H01M 10/48* (2006.01)
*H01M 10/613* (2014.01)
*H01M 10/625* (2014.01)
*H01M 10/647* (2014.01)
*H01M 10/6557* (2014.01)
*H01M 10/6563* (2014.01)
*H02J 7/00* (2006.01)

(56) References Cited

U.S. PATENT DOCUMENTS

| 2012/0114993 | A1* | 5/2012 | Park | H01M 2/1072 |
| | | | | 429/88 |
| 2013/0266839 | A1 | 10/2013 | Miura et al. | |
| 2015/0207347 | A1* | 7/2015 | Hori | H01M 10/482 |
| | | | | 320/118 |
| 2015/0214767 | A1 | 7/2015 | Fink | |

FOREIGN PATENT DOCUMENTS

| DE | 102012210596 A1 | 12/2013 | |
| EP | 2416435 A1 | 2/2012 | |
| JP | H08-289479 A | 1/1996 | |
| JP | 2002-083579 A1 | 6/2002 | |
| JP | 2008-283753 A1 | 11/2008 | |
| JP | 2009-134900 A1 | 6/2009 | |
| WO | WO 2012/161186 | * 11/2012 | .......... B60L 11/1864 |
| WO | WO2012161186 A1 | 11/2012 | |

OTHER PUBLICATIONS

The State Intellectual Property Office of the People's Republic of China, Notification of the First Office Action, Extended Search Report, and English translation, dated Sep. 4, 2018, regarding Application No. 2015101950114, 21 pages.

Japanese Patent Office Notice of Reasons for Rejection and English translation, dated Dec. 21, 2018, regarding Application No. JP2015-030348, 9 pages.

* cited by examiner

CONTROL SYSTEM FOR A BATTERY

BACKGROUND INFORMATION

1. Field

The present disclosure relates generally to a battery system and, in particular, to a battery system comprised of multiple battery cells. Still more particularly, the present disclosure relates to a method and apparatus for controlling operation of the battery system based on battery cell performance, battery cell temperature, and other selected factors.

2. Background

A battery system may include one or more battery cells. As used herein, a "battery cell" is a single electrochemical device that converts chemical energy into electrical energy to supply a voltage. A battery cell typically includes three components: an anode, a cathode, and an electrolyte. The electrolyte may be, for example, a liquid electrolyte.

Any number of battery cells may be electrically connected to form a series circuit that is configured to provide at least a selected total voltage output. As used herein, "a series circuit" is a circuit in which current can only flow along one path. In a series circuit, the same current goes through every component in the circuit. However, because there is only one path along which the current can flow, opening or breaking a series circuit at any point along the circuit may cause the entire series circuit to stop performing as desired. In other words, an open-circuit condition may be created.

For example, one battery cell in a group of battery cells arranged in a series circuit in a battery system may stop performing as desired, which may cause an opening in the series circuit. The battery cell may be referred to as being in a fault state. The fault state of this battery cell creates an open-circuit condition in the battery system. Because of the open-circuit condition, the battery system may be unable to produce the selected total voltage output, even though other battery cells in the battery system may be operating within selected tolerances. Having a battery system capable of operating to produce an acceptable lower voltage output, even in the presence of one or more battery cells being in a fault state, may be desirable.

Additionally, some currently available battery systems may be unable to properly cool. For example, with some currently available battery systems, the battery cells in the battery system may overheat, which may cause the battery system to stop operating in the desired manner. Having a system capable of accounting for issues that increase battery cell temperatures may be desirable. Therefore, it would be desirable to have a method and apparatus that take into account at least some of the issues discussed above, as well as other possible issues.

SUMMARY

In one illustrative embodiment, an apparatus comprises a housing, a plurality of battery cells, and a bypass circuit. The plurality of battery cells is connected in a series circuit within the housing. The plurality of battery cells is configured to supply a total voltage output. The bypass circuit is configured to determine whether a voltage output from a battery cell in the plurality of battery cells has fallen below a selected threshold. The bypass circuit is further configured to bypass the battery cell in the series circuit in response to a determination that the voltage output from the battery cell has fallen below the selected threshold.

In another illustrative embodiment, a battery system comprises a plurality of battery cells, a housing, a conditioned air system, and a bypass circuit. The plurality of battery cells is connected in a series circuit. The plurality of battery cells is configured to supply a total voltage output. The housing comprises a plurality of walls, a battery chamber, and a plurality of openings in the plurality of walls. The battery chamber is formed by the plurality of walls. The battery chamber is configured to hold the plurality of battery cells. The plurality of openings is configured to allow a fluid to flow from the battery chamber to an environment outside of the housing. The conditioned air system is configured to pump conditioned air into the battery chamber of the housing. The conditioned air creates a positive pressure inside the battery chamber that causes the fluid to flow from the battery chamber to the environment outside of the housing. The bypass circuit is configured to determine whether a voltage output from a battery cell in the plurality of battery cells has fallen below a selected threshold. The bypass circuit is further configured to bypass the battery cell in the series circuit in response to a determination that the voltage output from the battery cell has fallen below the selected threshold.

In yet another illustrative embodiment, a method for operating a battery system is provided. A determination is made as to whether a voltage output from a battery cell in a plurality of battery cells connected in a series circuit within a housing has fallen below a selected threshold. The battery cell in the series circuit is bypassed in response to a determination that the voltage output from the battery cell has fallen below the selected threshold.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a method and apparatus for bypassing a battery cell in a plurality of battery cells arranged in a series circuit in a battery system when the battery cell is in a fault state such that the battery system continues to operate within selected tolerances.

Further, the illustrative embodiments recognize and take into account that it may be desirable to have a method and apparatus for cooling the battery cells in a battery system such that the battery system does not overheat, become undesirably affected, and stop operating within selected tolerances. Still further, the illustrative embodiments recognize and take into account that it may be desirable to have a battery system capable of modulating the current flowing into a battery cell in a charging mode, the current flowing out of a battery cell to a load in a discharging mode, or both, based on the temperature of the casing of the battery cell. This type of current regulation may help prevent the battery cell from entering a fault state or some other undesired state.

Figure 1:
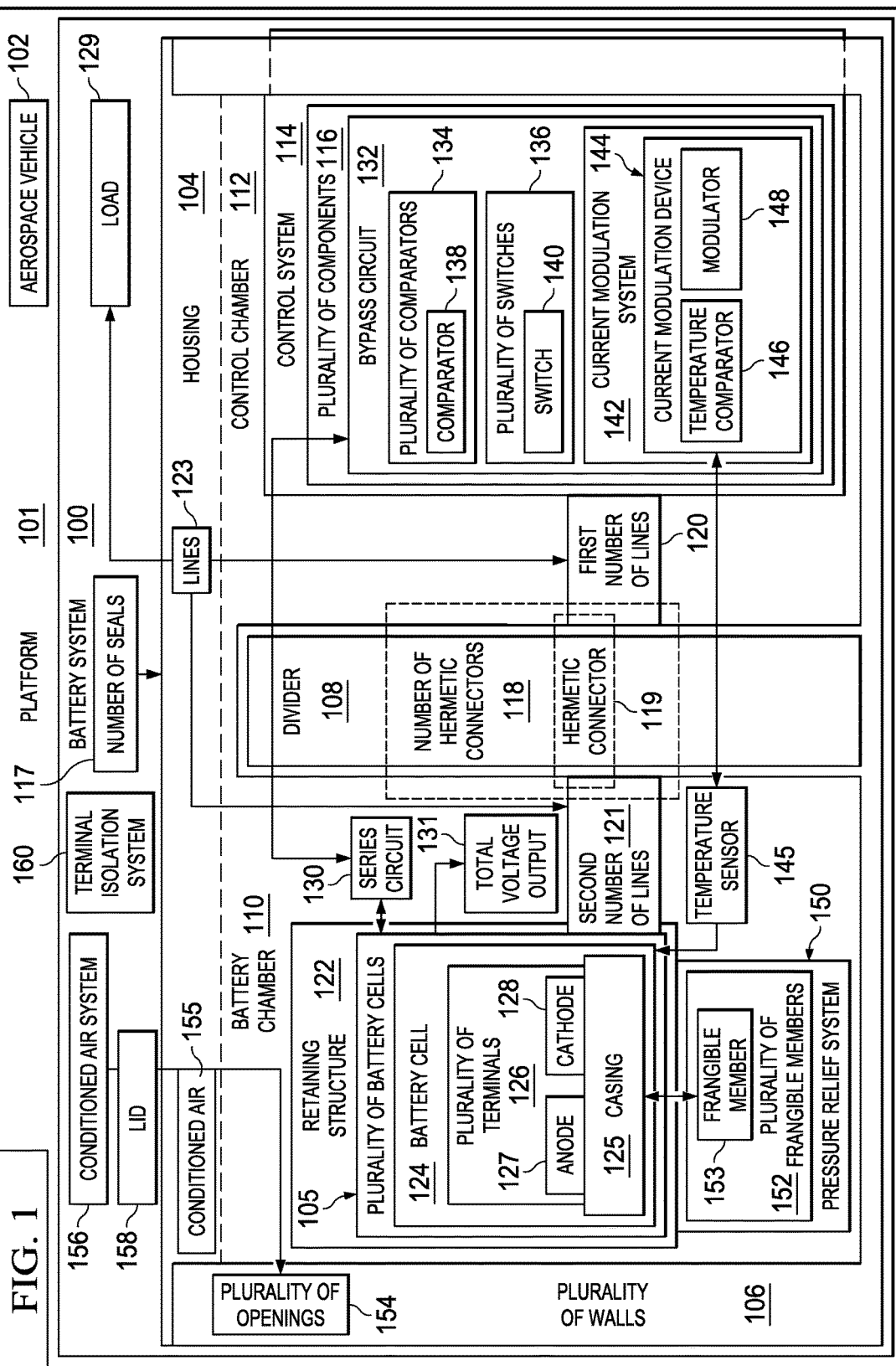
FIG. 1 is an illustration of a battery system in the form of a block diagram in accordance with an illustrative embodiment.

Referring now to the figures and, in particular, with reference to FIG. 1, an illustration of a battery system is depicted in the form of a block diagram in accordance with an illustrative embodiment. In this illustrative example, battery system 100 may be used in platform 101. Platform 101 may take a number of different forms. In this illustrative example, platform 101 takes the form of aerospace vehicle 102.

Aerospace vehicle 102 may take the form of an aircraft, an unmanned aerial vehicle, a helicopter, a rocket, a missile, a spacecraft, a space shuttle, or some other type of aerospace vehicle, depending on the implementation. In other illustrative examples, platform 101 may take some other form, such as, for example, but not limited to, a ground vehicle, a water vehicle, an engine system, or any device or system configured to run on the power supplied by battery system 100.

As depicted, battery system 100 includes housing 104 and plurality of battery cells 105. Housing 104 may have plurality of walls 106. In this illustrative example, plurality of walls 106 may include divider 108. In other illustrative examples, divider 108 may be associated with plurality of walls 106 in some other manner.

As used herein, when one component is "associated" with another component, the association is a physical association in the depicted examples. For example, a first component, such as divider 108, may be considered to be associated with a second component, such as plurality of walls 106, by being at least one of secured to the second component, bonded to the second component, mounted to the second component, welded to the second component, fastened to the second component, or connected to the second component in some other suitable manner. The first component also may be connected to the second component using a third component. Further, the first component may be considered to be associated with the second component by being formed as part of the second component, an extension of the second component, or both.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Plurality of walls 106 may form an inner chamber of housing 104. Divider 108 separates this inner chamber into battery chamber 110 and control chamber 112. Battery chamber 110 is used to hold plurality of battery cells 105. Retaining structure 122 may be used to retain plurality of battery cells 105 within a fixed arrangement within battery chamber 110 of housing 104.

In this illustrative example, retaining structure 122 is comprised of a material that is both thermally conductive and electrically insulative. Retaining structure 122 may be thermally conductive to allow cooling of plurality of battery cells 105. Retaining structure 122 may be electrically insulative to keep each of plurality of battery cells 105 electrically isolated from the other battery cells in plurality of battery cells 105.

Control chamber 112 is used to hold at least a portion of control system 114. Control system 114 may be considered part of battery system 100 or separate from battery system 100, depending on the implementation. In some cases, a portion of control system 114 may be considered part of battery system 100, while another portion of battery system 100 may be considered separate from battery system 100.

In this illustrative example, control system 114 includes plurality of components 116. At least a portion of plurality of components 116 may be located within control chamber 112. Further, depending on the implementation, a portion of plurality of components 116 may be located outside of housing 104, within battery chamber 110, or both.

At least one of number of seals 117 or number of hermetic connectors 118 may be associated with housing 104. As used herein, a "number of" items may include one or more items. In this manner, number of seals 117 may include one or more seals and number of hermetic connectors 118 may include one or more hermetic connectors.

As used herein, a "seal" may be any object configured to form an air-tight seal. A seal in number of seals 117 may take the form of, for example, without limitation, a gasket, an isolation plate, an O-ring, or some other type of seal. Each of number of seals 117 may be comprised of at least one of an elastomeric material such as a silicone material, rubber, or some other type of material. Further, as used herein, a "hermetic connector" may be used to provide a vacuum-sealed, air-tight connection between at least two components.

Divider 108, number of seals 117, and number of hermetic connectors 118 may be used to create isolation between the components located within control chamber 112 and the components located within battery chamber 110. This isolation may prevent any undesired fluids that may leak out from or be expelled from plurality of battery cells 105 from causing any undesired effects within control chamber 112.

As used herein, a "fluid" may be any substance that flows or deforms under an applied shear stress. A fluid may be comprised of any number of liquids, gases, or combination thereof. An undesired fluid that may leak from or be expelled from plurality of battery cells 105 may be comprised of, for example, without limitation, at least one of air, a liquid electrolyte material, a gaseous electrolyte material, or some other type of undesired fluid.

Number of hermetic connectors 118 may be associated with divider 108, a different wall in plurality of walls 106, or both. Hermetic connector 119 may be an example of one of number of hermetic connectors 118. Hermetic connector 119 is associated with divider 108. Hermetic connector 119 may be comprised of any number of hermetic feedthroughs.

Hermetic connector 119 may be used to connect first number of lines 120 from control system 114 within control chamber 112 to second number of lines 121 within battery chamber 110 through divider 108. As used herein, a "line," such as a line in first number of lines 120 or a line in second number of lines 121, may be an electrical line or wire.

In one illustrative example, first number of lines 120 and second number of lines 121 may be used to carry current to and from at least a portion of plurality of battery cells 105. First number of lines 120 and second number of lines 121 may be part of lines 123. Lines 123 may be used to electrically connect control system 114 to plurality of battery cells 105, other components to plurality of battery cells 105, plurality of battery cells 105 to each other, components in plurality of components 116 to each other, battery system 100 to load 129, or some combination thereof.

As depicted, battery cell 124 is an example of one of plurality of battery cells 105. Battery cell 124 includes casing 125 and plurality of terminals 126. Casing 125 may house an electrolyte and in some cases, other components of battery cell 124. Plurality of terminals 126 includes anode 127 and cathode 128, which are associated with casing 125.

The battery cells in plurality of battery cells 105 are electrically connected to form series circuit 130 within battery chamber 110. Current can flow along only one path in series circuit 130. Further, the same current flows through each of plurality of battery cells 105 in series circuit 130. Plurality of battery cells 105 in series circuit 130 is configured to supply total voltage output 131 to load 129.

In this illustrative example, control system 114 includes bypass circuit 132. Bypass circuit 132 may be implemented as part of series circuit 130 in this illustrative example. Bypass circuit 132 is configured to determine whether a voltage output from a battery cell in plurality of battery cells 105 has fallen below a selected threshold and to bypass the battery cell in the series circuit in response to a determination that the voltage output from the battery cell has fallen below the selected threshold.

In one illustrative example, bypass circuit 132 includes plurality of comparators 134 and plurality of switches 136. Each of plurality of comparators 134 and each of plurality of switches 136 may correspond to one of plurality of battery cells 105. For example, comparator 138 is an example of one of plurality of comparators 134. Comparator 138 is configured to determine whether the voltage output from a corresponding battery cell in plurality of battery cells 105 has fallen below the selected threshold.

In one illustrative example, battery cell 124 may be the corresponding battery cell for comparator 138. In this example, comparator 138 measures the voltage output at cathode 128 of battery cell 124 to determine whether the voltage output of battery cell 124 has fallen below the selected threshold.

Switch 140 is an example of one of plurality of switches 136. Switch 140 may correspond to battery cell 124 in the illustrative example. Comparator 138 controls whether switch 140 is in a first state or a second state.

For example, without limitation, when battery cell 124 is producing a voltage output that is equal to or above the selected threshold, switch 140 may be in a first state. When switch 140 is in the first state, a previous battery cell, with respect to battery cell 124, and the path of current flow in series circuit 130 is connected to battery cell 124 such that current from the previous battery cell flows into battery cell 124.

However, when the voltage output produced by battery cell 124 drops below the selected threshold, comparator 138 controls switch 140 such that switch 140 changes from the first state to the second state. When switch 140 is in the second state, the previous battery cell is connected to a next battery cell, with respect to battery cell 124, and the path of current flow in series circuit 130 such that battery cell 124 is bypassed.

In this manner, even when one or more battery cells does not perform within selected tolerances, battery system 100 may continue to operate to produce at least the total voltage output required by load 129. For example, each of plurality of battery cells 105 may be configured to produce a voltage output of about 4 volts when the battery cell is operating within selected tolerances. In this manner, when plurality of battery cells 105 includes eight battery cells, total voltage output 131 may be about 32 volts. However, load 129 may only require about 18 volts to perform within selected tolerances.

In this illustrative example, the selected threshold for each of plurality of comparators 134 may be, for example, without limitation, about 2 volts or about 2.25 volts. When one of plurality of battery cells 105, such as battery cell 124, stops operating within selected tolerances, bypass circuit 132 causes that battery cell to be bypassed such that an open-circuit condition is not created. Instead, battery system 100 continues to operate and plurality of battery cells 105 produce total voltage output 131 of about 28 volts. When load 129 requires about 18 volts to perform as desired, up to three battery cells may be bypassed before battery system 100 is no longer able to supply adequate voltage to load 129.

Control system 114 also includes current modulation system 142. Current modulation system 142 is configured to control the current flowing into plurality of battery cells 105 in a charging mode or the current flowing out of plurality of battery cells 105 to a load in a discharging mode. In particular, current modulation system 142 may control, individually or in combination, at least one of the current flowing into each of plurality of battery cells 105 in a charging mode or the current flowing out of each of plurality of battery cells 105 to a load in a discharging mode.

In particular, current modulation system 142 includes a plurality of temperature sensors, a plurality of temperature comparators, and a plurality of modulators, which together form a plurality of current modulation devices. Each of the plurality of current modulation devices is used to regulate at least one of current flow into or current flow out of a corresponding battery cell in plurality of battery cells 105. In this manner, each battery cell in plurality of battery cells 105 may be protected against overheating based on current flow.

In this illustrative example, current modulation device 144 is an example of one of the plurality of current modulation devices in current modulation system 142. Current modulation device 144 corresponds to battery cell 124. Current modulation device 144 includes temperature sensor 145, temperature comparator 146, and modulator 148.

Temperature sensor 145 is used to measure the temperature of casing 125 of battery cell 124. In one illustrative example, temperature sensor 145 may take the form of a thermocouple. Temperature comparator 146 is used to determine whether the temperature measured is outside of selected tolerances. In other words, temperature comparator 146 may determine whether the temperature measured is greater than a maximum temperature threshold or lower than a minimum temperature threshold. Modulator 148 modulates at least one of the current flowing into battery cell 124 or the current flowing out of battery cell 124 in response to a determination by temperature comparator 146 that the temperature of casing 125 is outside of selected tolerances.

Battery system 100 may also include pressure relief system 150. Pressure relief system 150 allows a pressure buildup that occurs within any one of plurality of battery cells 105 to be released. Pressure relief system 150 is comprised of plurality of frangible members 152 associated with plurality of battery cells 105. In one illustrative example, each of plurality of frangible members 152 is associated with the casing of a corresponding one of plurality of battery cells 105. Frangible member 153 is an example of one of plurality of frangible members 152. Frangible member 153 may be associated with casing 125 of battery cell 124.

Plurality of walls 106 may have plurality of openings 154. Frangible member 153 is configured to break apart in response to an internal pressure within casing 125 of battery cell 124 rising above a selected pressure threshold such that the pressure buildup within casing 125 is released through an opening in casing 125 created by frangible member 153 breaking apart. In particular, a fluid within casing 125 may be released through this opening. The fluid may be an undesired fluid comprised of, for example, electrolyte gases or some other type of liquid, gas, or combination thereof.

When frangible member 153 is associated with casing 125 of battery cell 124, the side of casing 125 at which frangible member 153 is present may be sealed against a corresponding wall in plurality of walls 106. This wall may have a vent opening that may allow any undesired fluids that escape from the opening in casing 125 of battery cell 124, created in response to frangible member 153 breaking apart, to vent out of housing 104 into the environment around battery system 100 through this vent opening. In this manner, the pressure buildup may be released from battery cell 124 without affecting any of the other battery cells in plurality of battery cells 105. The vent opening may also be referred to as a vent port or an exit hole.

Still further, battery system 100 may include conditioned air system 156. Conditioned air system 156 is configured to pump conditioned air 155 into battery chamber 110 to create a positive pressure inside battery chamber 110. This positive pressure causes fluid to flow from battery chamber 110 to an environment outside of housing 104. In this example, the fluid that flows from battery chamber 110 to the environment outside of housing 104 may include any number of undesired fluids, at least a portion of conditioned air 155, or both.

Further, conditioned air 155 may be air that is cooled to a selected temperature to allow cooling of plurality of battery cells 105. In some cases, conditioned air 155 may be filtered such that conditioned air 155 does not contain any undesired gaseous elements. Depending on the implementation, conditioned air 155 may be air that is drawn from a source other than the air surrounding housing 104 of battery system 100.

Lid 158 may be used to enclose housing 104. In some cases, lid 158 may be considered part of housing 104. Depending on the implementation, conditioned air 155 may be pumped into battery chamber 110 through lid 158.

In some cases, battery system 100 may include terminal isolation system 160. Terminal isolation system 160 may be used to isolate the terminals of plurality of battery cells 105 from the casings of plurality of battery cells 105. In particular, any undesired fluids that may leak out from the casings of plurality of battery cells 105 may be kept isolated from the terminals of plurality of battery cells 105. This type of isolation of the terminals may help prevent undesired electrical effects. Terminal isolation system 160 may include any number of isolation plates, gaskets, seals, or other types of elements.

The illustration of battery system 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, although control system 114 is depicted entirely within control chamber 112 in FIG. 1, a portion of control system 114 may be located in battery chamber 110 in other illustrative examples. In some illustrative examples, current modulation device 144 may be implemented using components at least one of in addition to or in place of temperature sensor 145, temperature comparator 146, or modulator 148.

Figure 2:
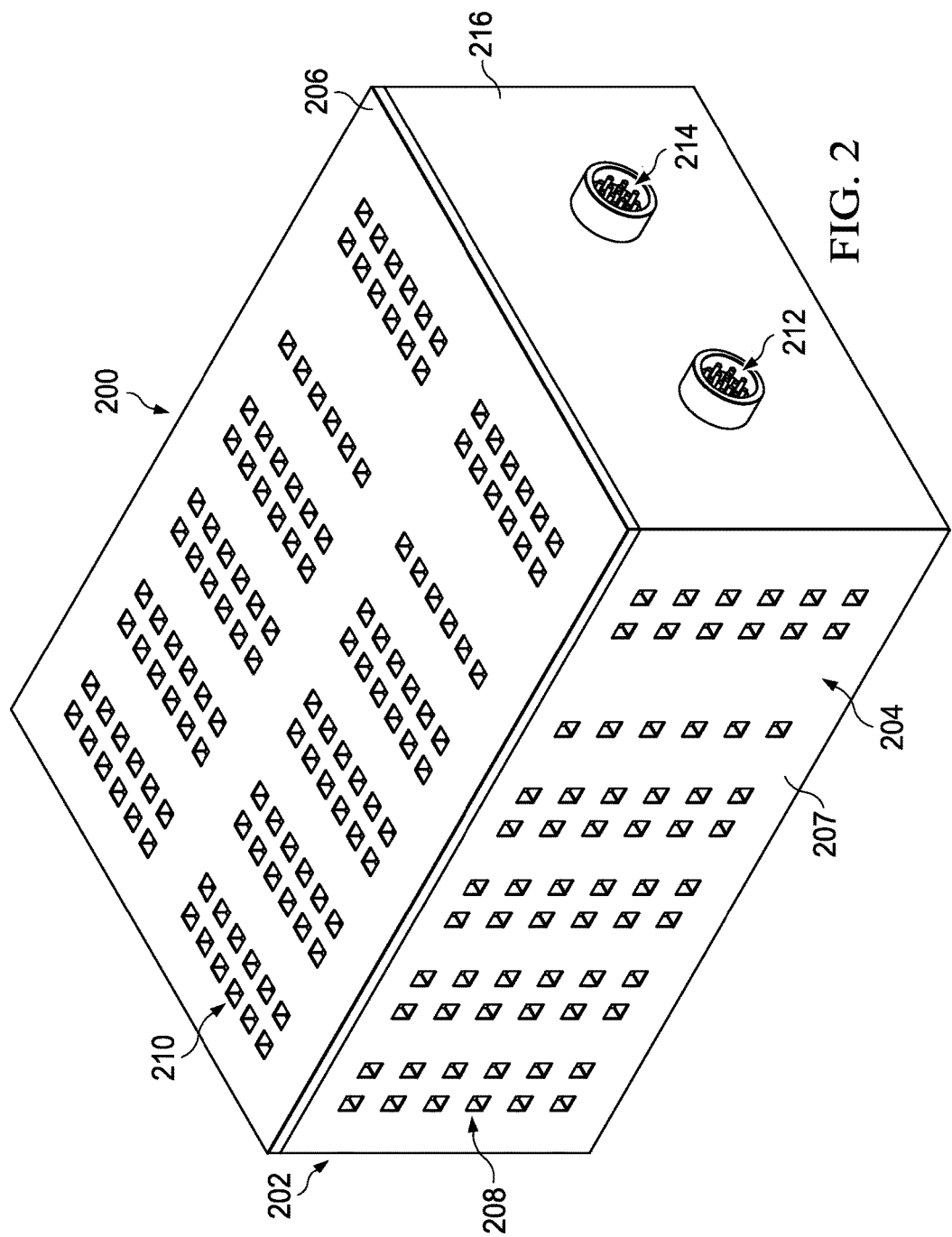
FIG. 2 is an illustration of a top isometric view of a battery system in accordance with an illustrative embodiment.

With reference now to FIG. 2, an illustration of a top isometric view of a battery system is depicted in accordance with an illustrative embodiment. In FIG. 2, battery system 200 is an example of one implementation for battery system 100 in FIG. 1. As depicted, battery system 200 includes housing 202, which may be an example of one implementation for housing 104 in FIG. 1.

Housing 202 includes plurality of walls 204 and lid 206, which may be examples of implementations for plurality of walls 106 and lid 158, respectively, in FIG. 1. As depicted, wall 207 and wall 216 of plurality of walls 204 are shown. Wall 207 has plurality of openings 208, which may be an example of one implementation for a portion of plurality of openings 154 in FIG. 1. Lid 206 also has plurality of openings 210. In this illustrative example, plurality of openings 208 and plurality of openings 210 are perforations.

Hermetic connector 212 and hermetic connector 214 are associated with wall 216. Hermetic connector 212 and hermetic connector 214 are an example of one implementation for at least a portion of number of hermetic connectors 118 in FIG. 1. Hermetic connector 212 and hermetic connector 214 may be used to connect battery system 200 to lines for carrying current into and out of battery system 200.

Figure 3:
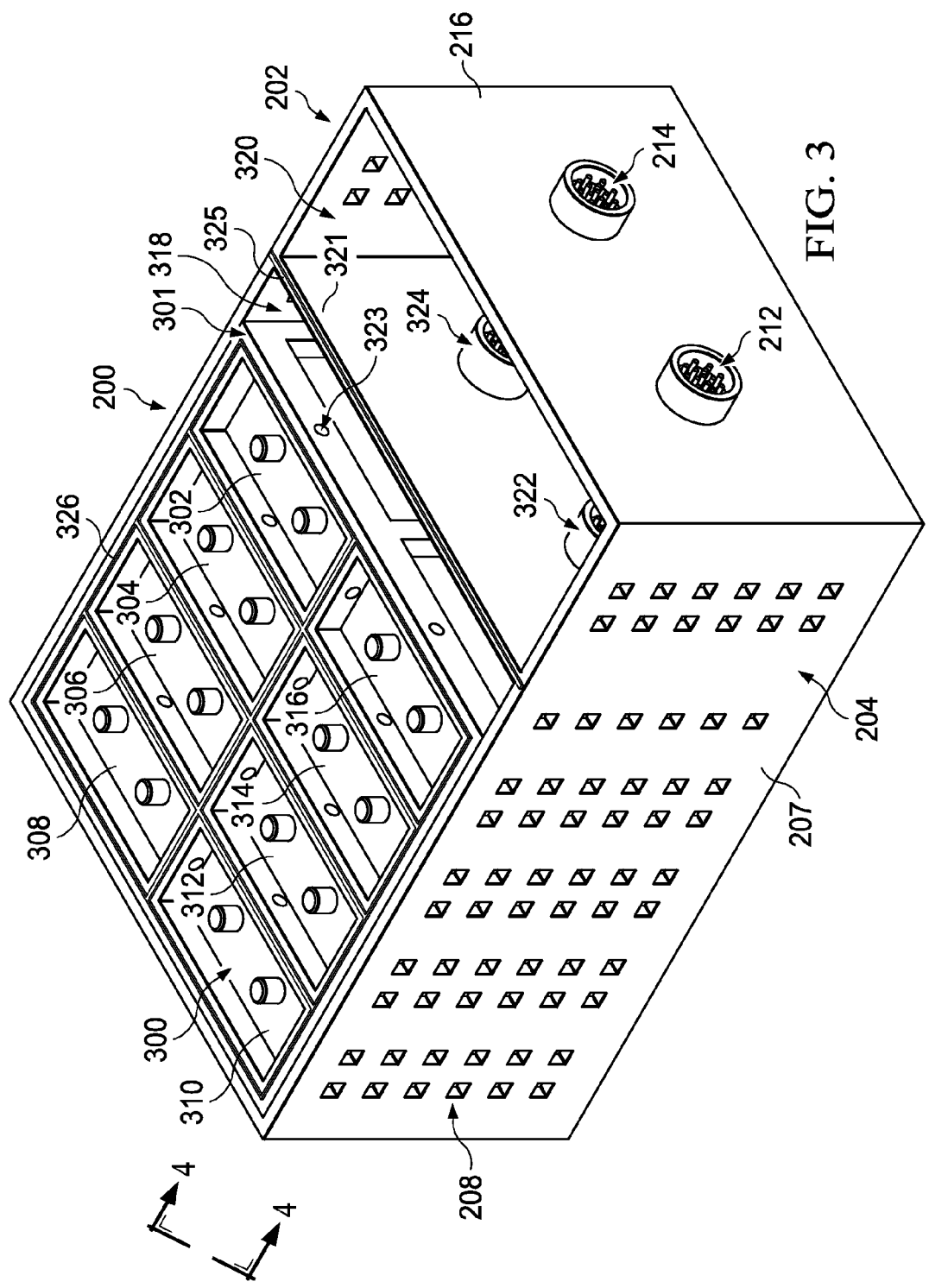
FIG. 3 is an illustration of a top isometric view of a battery system without a lid in accordance with an illustrative embodiment.

With reference now to FIG. 3, an illustration of a top isometric view of battery system 200 from FIG. 2 without lid 206 is depicted in accordance with an illustrative embodiment. As depicted, battery system 200 includes plurality of battery cells 300 and retaining structure 301, which may be examples of implementations for plurality of battery cells 105 and retaining structure 122, respectively, in FIG. 1.

Plurality of battery cells 300 includes battery cells 302, 304, 306, 308, 310, 312, 314, and 316. Plurality of battery cells 300 may be electrically connected to form a series circuit (connections not shown). Retaining structure 301 may be used to hold plurality of battery cells 300 in a fixed arrangement. Further, retaining structure 301 may be comprised of a material that is thermally conductive to allow cooling of plurality of battery cells 300 and electrically insulative to keep plurality of battery cells 300 electrically isolated from each other and isolated from plurality of walls 204 of housing 202.

Plurality of walls 204 of housing 202 includes divider 321. Divider 321 is an example of one implementation for divider 108 in FIG. 1. Divider 321 is configured to form battery chamber 318 and control chamber 320 within housing 202. Battery chamber 318 and control chamber 320 may be examples of implementations for battery chamber 110 and control chamber 112, respectively, in FIG. 1. Plurality of battery cells 300 and retaining structure 301 are held within battery chamber 318. A control system (not shown), implemented in a manner such as control system 114 in FIG. 1, may be at least partially held within control chamber 320.

In this illustrative example, hermetic connector 322 and hermetic connector 324 are associated with divider 321. Hermetic connector 322 and hermetic connector 324 are an example of one implementation for at least a portion of number of hermetic connectors 118 in FIG. 1. Hermetic connector 322 and hermetic connector 324 may be used to connect lines (not shown) in control chamber 320 to lines (not shown) in battery chamber 318.

In this illustrative example, retaining structure 301 may have plurality of channels 323. Lines connecting plurality of battery cells 300 to each other and to hermetic connector 322 and hermetic connector 324 may be threaded through plurality of channels 323.

As depicted, seal 325 may be positioned on top of divider 321 such that a hermetic seal is formed between battery chamber 318 and control chamber 320 when lid 206 from FIG. 2 is placed on top of plurality of walls 204. Seal 326 may be positioned on top of retaining structure 301 such that each of plurality of battery cells 300 may be hermetically sealed off from the other battery cells in plurality of battery cells 300 when lid 206 from FIG. 2 is placed on top of plurality of walls 204. Seal 325 and seal 326 may be an example of one implementation for seals that may be included in number of seals 117 in FIG. 1.

Divider 321, hermetic connector 212, hermetic connector 214, hermetic connector 322, hermetic connector 324, seal 325, and seal 326 may be used to provide a hermetic barrier between the components located within battery chamber 318 and the components located within control chamber 320. In this manner, plurality of battery cells 300 may be kept isolated such that any undesired fluids that may leak out of, be expelled from, or escape from plurality of battery cells 300 may not enter control chamber 320.

Figure 4:
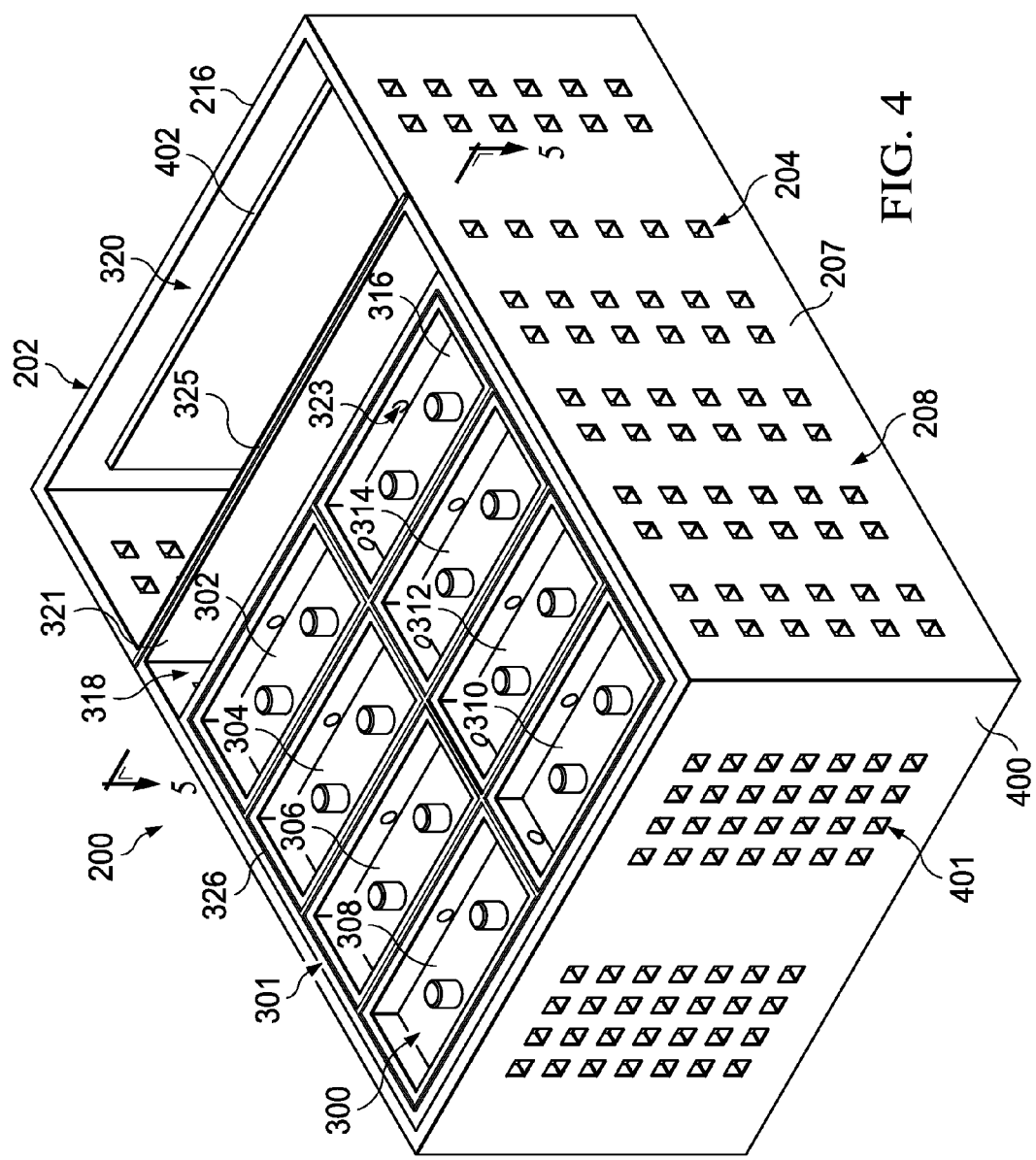
FIG. 4 is an illustration of a different top isometric view of a battery system in accordance with an illustrative embodiment.

With reference now to FIG. 4, an illustration of a different top isometric view of battery system 200 from FIG. 3 is depicted in accordance with an illustrative embodiment. In this illustrative example, a top isometric view of battery system 200 from FIG. 3 is depicted taken in the direction of lines 4-4 in FIG. 3.

As depicted, plurality of walls 204 includes wall 400 having plurality of openings 401. Plurality of openings 401 may be an example of one implementation for a portion of plurality of openings 154 in FIG. 1. Plurality of openings 401 may be perforations in this example.

Additionally, circuit board 402 is located within control chamber 320. Circuit board 402 may include at least a portion of the components that form a control system for battery system 200, such as control system 114 for battery system 100 in FIG. 1. Divider 321 and seal 325 may together keep circuit board 402 in control chamber 320 hermetically isolated from plurality of battery cells 300 in battery chamber 318.

Figure 5:
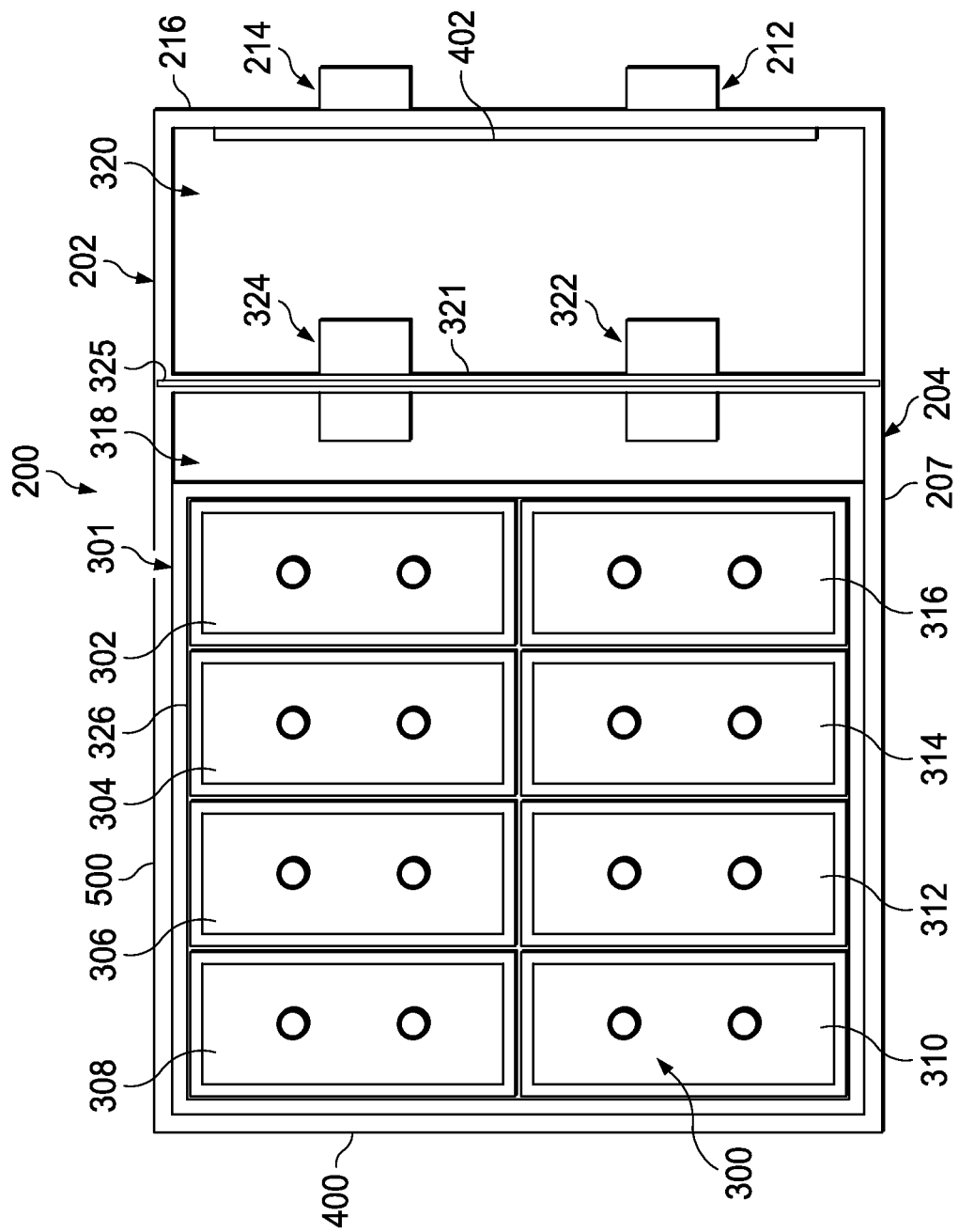
FIG. 5 is an illustration of a top view of a battery system in accordance with an illustrative embodiment.

With reference now to FIG. 5, an illustration of a top view of battery system 200 from FIG. 4 is depicted in accordance with an illustrative embodiment. In this illustrative example, a top view of battery system 200 from FIG. 4 is depicted taken in the direction of lines 5-5 in FIG. 4. As depicted, plurality of walls 204 also includes wall 500. Wall 500 may have a plurality of openings (not shown), similar to plurality of openings 208 in wall 207 in FIG. 2 and plurality of openings 401 in wall 400 in FIG. 4.

Figure 6:
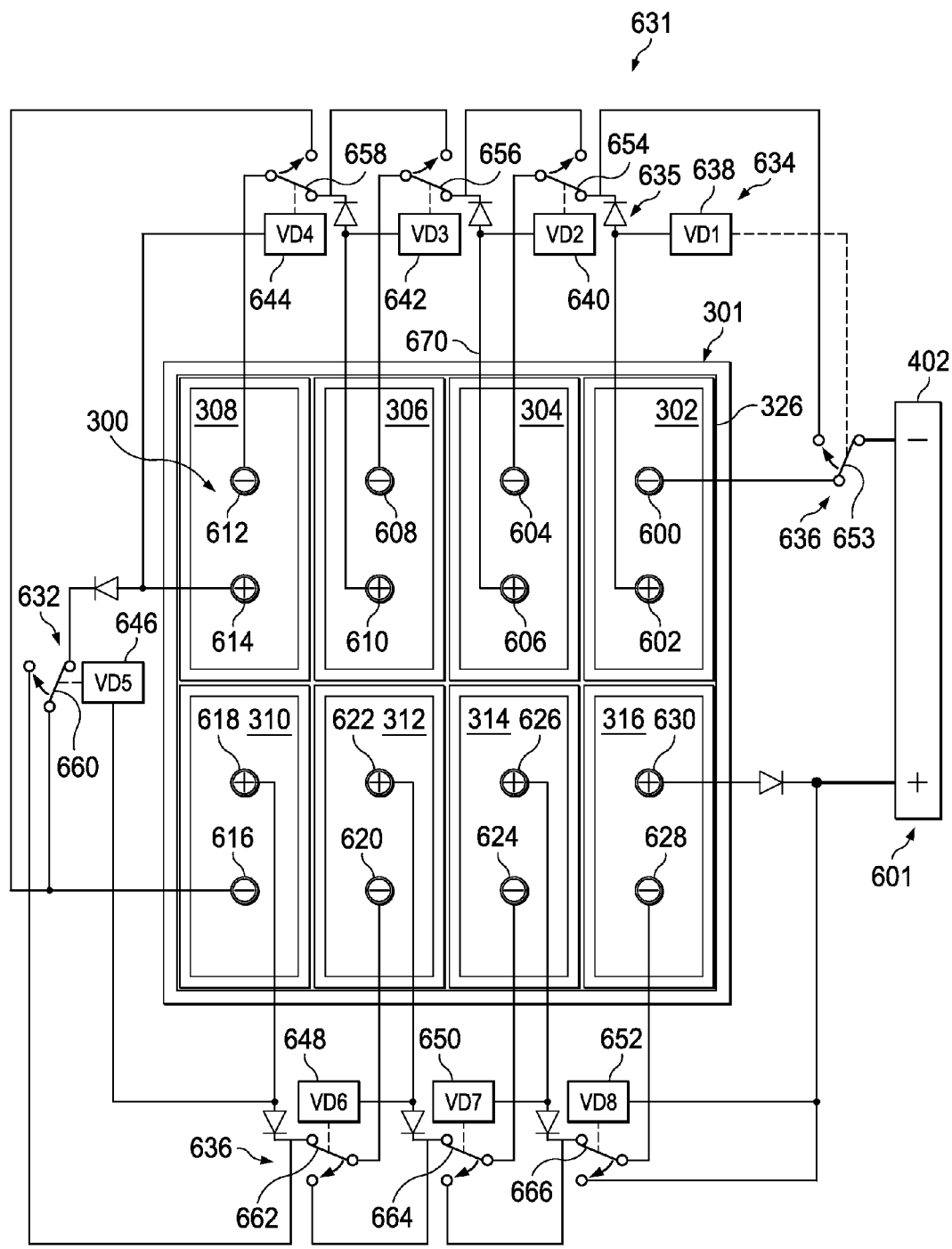
FIG. 6 is an illustration of a top view of a plurality of battery cells and a retaining structure with a bypass circuit connected to a plurality of battery cells in accordance with an illustrative embodiment.

Turning now to FIG. 6, an illustration of a top view of plurality of battery cells 300 and retaining structure 301 from FIG. 5 with a bypass circuit connected to plurality of battery cells 300 is depicted in accordance with an illustrative embodiment. Each of plurality of battery cells 300 may have an anode and a cathode, such as anode 127 and cathode 128 of battery cell 124 in FIG. 1. Current may flow from the anode to the cathode in this illustrative example.

As depicted, battery cell 302 has anode 600 and cathode 602; battery cell 304 has anode 604 and cathode 606; battery cell 306 has anode 608 and cathode 610; battery cell 308 has anode 612 and cathode 614; battery cell 310 has anode 616 and cathode 618; battery cell 312 has anode 620 and cathode 622; battery cell 314 has anode 624 and cathode 626; and battery cell 316 has anode 628 and cathode 630.

As depicted, the battery cells in plurality of battery cells 300 are electrically connected to load 601 to form series circuit 631. Current flows from load 601 into anode 600 of battery cell 302 and back to load 601 from cathode 630 of battery cell 316. Series circuit 631 may be an example of one implementation for series circuit 130 in FIG. 1. Load 601 may be an example of one implementation for load 129 in FIG. 1.

Bypass circuit 632 may be implemented within series circuit 631. Bypass circuit 632 is an example of one implementation for bypass circuit 132 in FIG. 1. Bypass circuit 632 may be implemented on circuit board 402 shown in FIGS. 4-5.

As depicted, bypass circuit 632 includes plurality of comparators 634 and plurality of switches 636. Plurality of comparators 634 and plurality of switches 636 may be examples of implementations for plurality of comparators 134 and plurality of switches 136, respectively, in FIG. 1.

Plurality of comparators 634 includes comparators 638, 640, 642, 644, 646, 648, 650, and 652, which correspond to battery cells 302, 304, 306, 308, 310, 312, 314, and 316, respectively. Plurality of switches 636 includes switches 653, 654, 656, 658, 660, 662, 664, and 666, which correspond to battery cells 304, 306, 308, 310, 312, 314, 316, and 302, respectively.

Comparators 638, 640, 642, 644, 646, 648, 650, and 652 are configured to control switches 653, 654, 656, 658, 660, 662, 664, and 666, respectively. Each of plurality of comparators 634 may determine whether the corresponding battery cell needs to be bypassed. In response to a determination that the corresponding battery cell needs to be bypassed, the comparator may control the switch corresponding to the comparator to change from a first state in which the corresponding battery cell is not bypassed to a second state in which the corresponding battery cell is bypassed.

As one illustrative example, switch 654 is currently in a first state. With switch 654 in the first state, battery cell 304 is not bypassed. In other words, current flowing out of cathode 602 of battery cell 302 flows into anode 604 of battery cell 304 when switch 654 is in the first state. Battery cell 302 is the previous battery cell with respect to battery cell 304 and the path of current flow through series circuit 631.

Comparator 640 may determine whether the voltage output of battery cell 304 has fallen below a selected threshold. In response to a determination that the voltage output of battery cell 304 has fallen below the selected threshold, comparator 640 controls switch 654 to change from the first state to a second state. With switch 654 in the second state, battery cell 304 is bypassed. In other words, current flowing out of cathode 602 of battery cell 302 does not flow into anode 604 of battery cell 304 when switch 654 is in the second state. Instead, with switch 654 in the second state, current flowing out of cathode 602 bypasses battery cell 304 and flows into anode 608 of battery cell 306, as long as switch 656 corresponding to battery cell 306 is in the first state. Battery cell 306 is the next battery cell with respect to battery cell 304 and the path of current flow through series circuit 631.

In this manner, any battery cells that are not operating within selected tolerances or performing as desired may be bypassed to prevent an open-circuit condition from being created. Thus, battery system 200 may be allowed to continue operating even when one or more battery cells stop operating within selected tolerances or performing as desired.

Figure 7:
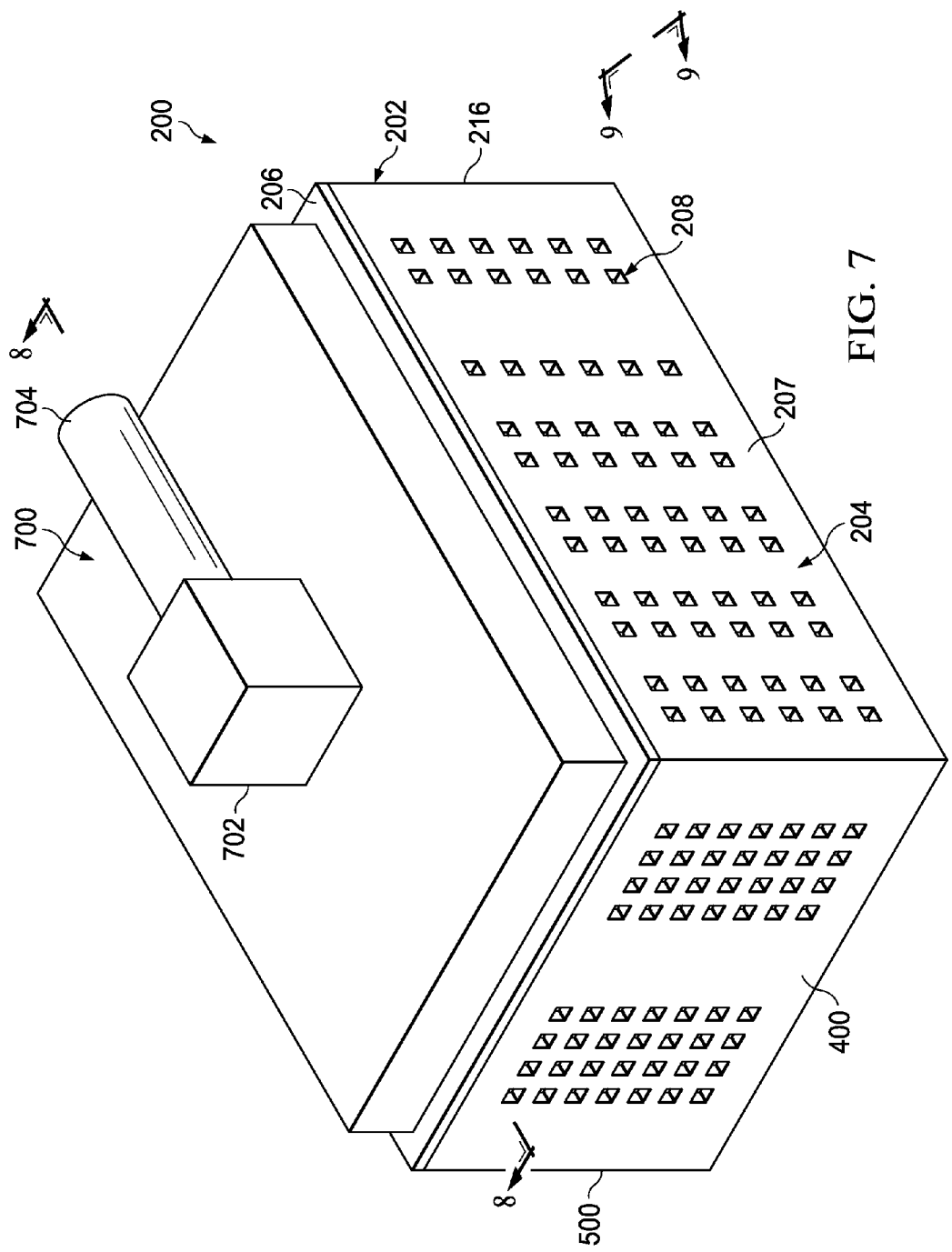
FIG. 7 is an illustration of an isometric view of a battery system with a conditioned air system in accordance with an illustrative embodiment.

With reference now to FIG. 7, an illustration of an isometric view of battery system 200 from FIG. 2 with a conditioned air system is depicted in accordance with an illustrative embodiment. In this illustrative example, battery system 200 includes conditioned air system 700. Conditioned air system 700 is an example of one implementation for conditioned air system 156 in FIG. 1.

Conditioned air system 700 includes structure 702 and tube 704. Conditioned air system 700 is configured to pump conditioned air into battery chamber 318 and control chamber 320 of housing 202 shown in FIG. 3.

Figure 8:
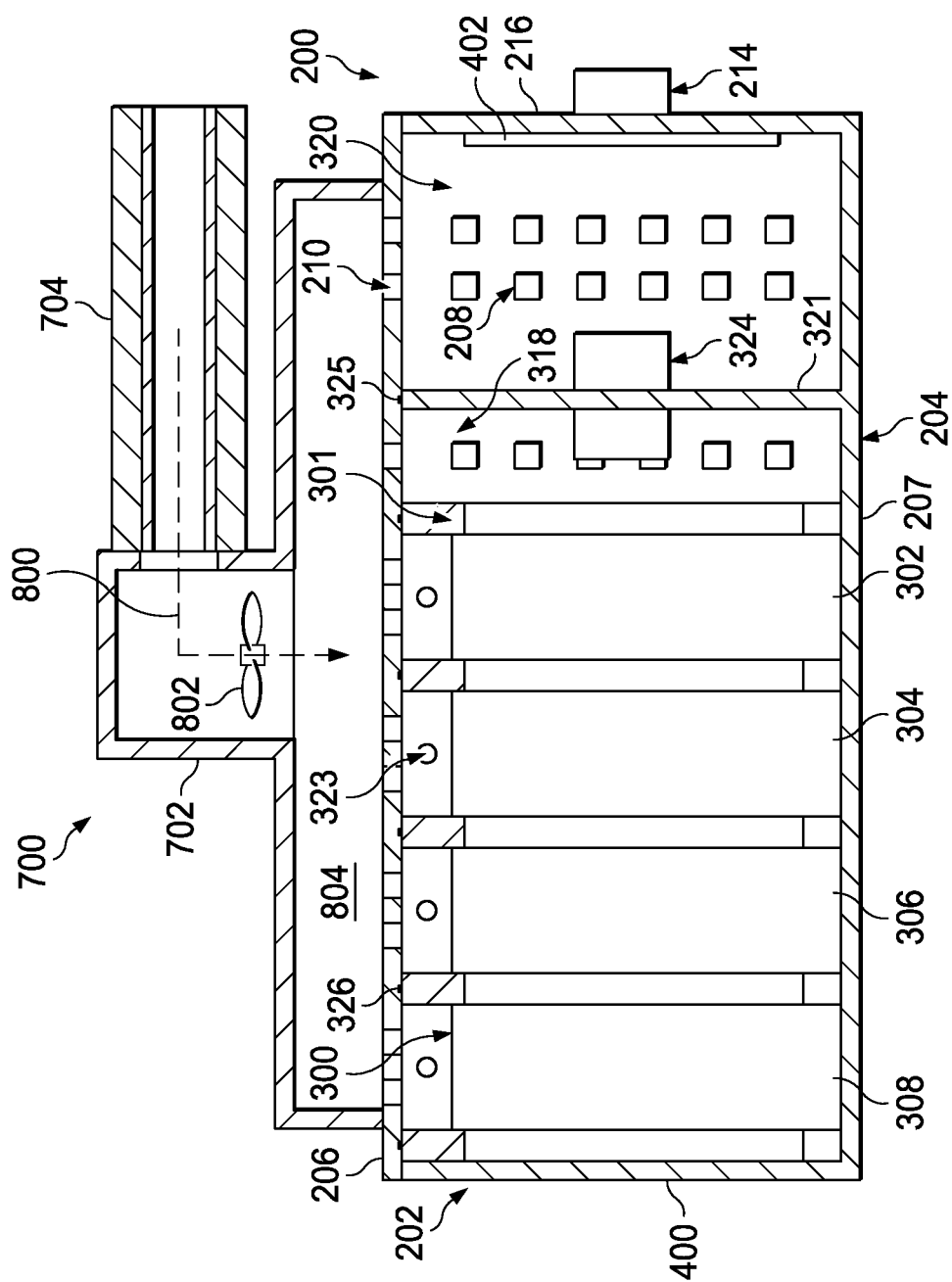
FIG. 8 is an illustration of a cross-sectional view of a battery system with a conditioned air system in accordance with an illustrative embodiment.

Turning now to FIG. 8, an illustration of a cross-sectional view of battery system 200 with conditioned air system 700 from FIG. 7 is depicted in accordance with an illustrative embodiment. As depicted, conditioned air may flow through tube 704 in the direction of arrow 800.

Structure 702 may have air chamber 804. Air chamber 804 may also be referred to as a plenum. Fan 802 may be located within structure 702 in this illustrative example. In other illustrative examples, fan 802 may be separate from structure 702.

Fan 802 may be used to pump conditioned air that enters air chamber 804 from tube 704 into battery chamber 318 and control chamber 320 through plurality of openings 210 in lid 206. The conditioned air within battery chamber 318 creates a positive pressure that causes a fluid to be vented from battery chamber 318 to an environment outside of housing 202. The fluid may be, for example, an undesired fluid comprised of, for example, without limitation, at least one of air, a liquid electrolyte material, a gaseous electrolyte material, or some other type of undesired fluid.

Figure 9:
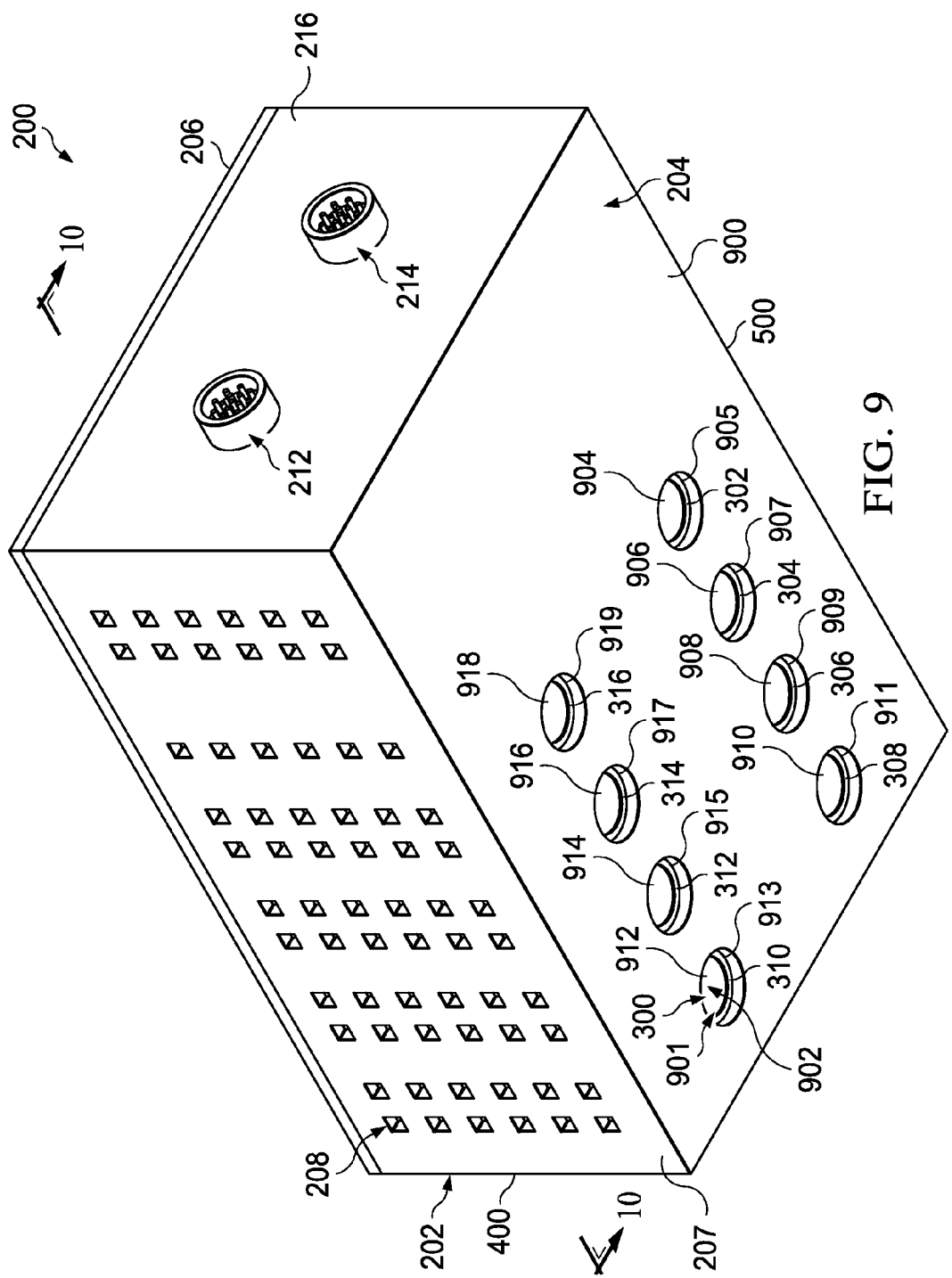
FIG. 9 is an illustration of a bottom isometric view of a battery system in accordance with an illustrative embodiment.

With reference now to FIG. 9, an illustration of a bottom isometric view of battery system 200 from FIG. 7 is depicted in accordance with an illustrative embodiment. In this illustrative example, a bottom isometric view of battery system 200 from FIG. 7 is shown without conditioned air system 700 in FIG. 7 and taken in the direction of lines 9-9 in FIG. 7.

As depicted, plurality of walls 204 includes wall 900. Wall 900 has plurality of openings 901. Plurality of openings 901 may be an example of one implementation for a portion of plurality of openings 154 in FIG. 1. Plurality of openings 901 may be a plurality of vent openings in this illustrative example.

The bottoms of the casings of plurality of battery cells 300 may be seen in this illustrative example. As depicted, plurality of frangible members 902 is associated with plurality of battery cells 300. Plurality of frangible members 902 may be an example of one implementation for plurality of frangible members 152 in FIG. 1.

Plurality of frangible members 902 includes frangible members 904, 906, 908, 910, 912, 914, 916, and 918. Frangible members 904, 906, 908, 910, 912, 914, 916, and 918 are associated with casings 905, 907, 909, 911, 913, 915, 917, and 919, respectively, of battery cells 302, 304, 306, 308, 310, 312, 314, and 316, respectively.

Each of plurality of frangible members 902 is configured to break apart in response to an internal pressure within the corresponding casing rising above a selected pressure threshold. The pressure buildup within the corresponding casing is allowed to vent out of housing 202 through the corresponding opening of plurality of openings 901.

Figure 10:
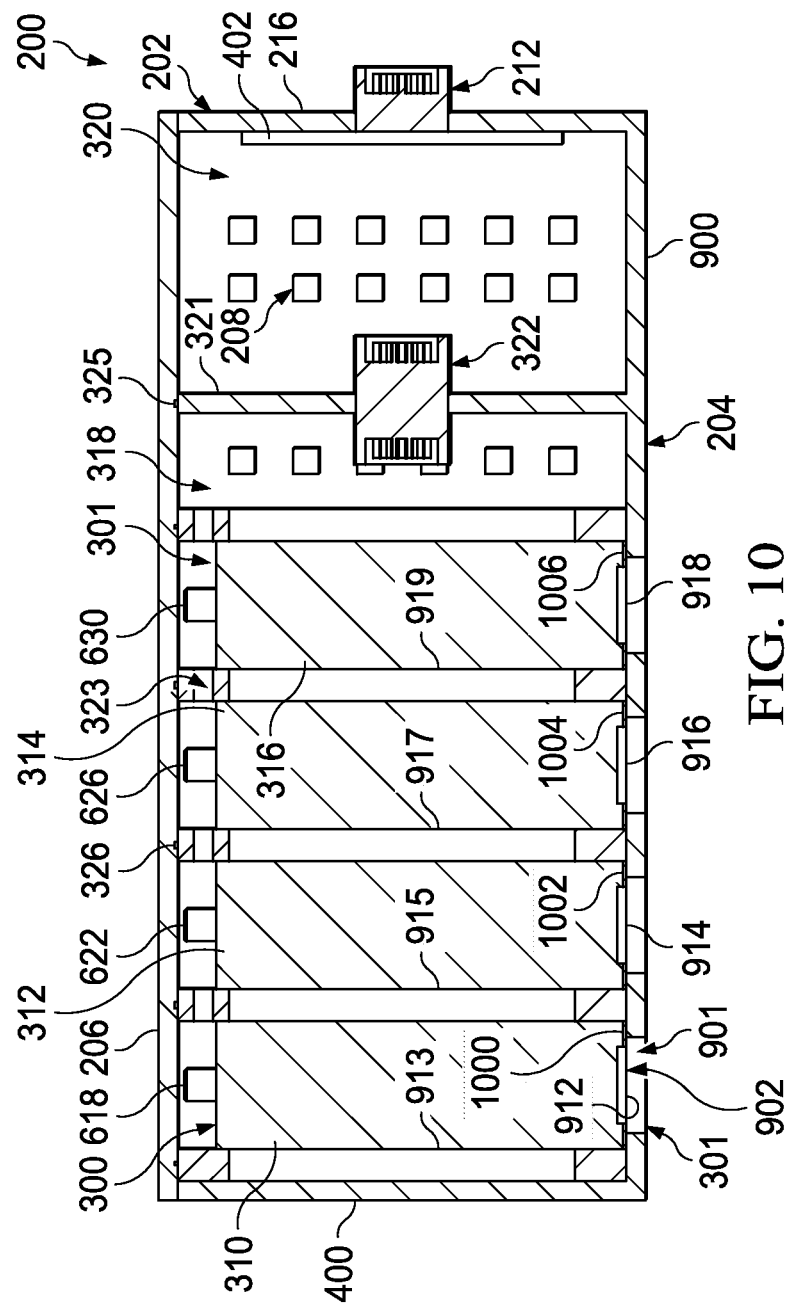
FIG. 10 is an illustration of a cross-sectional view of a battery system in accordance with an illustrative embodiment.

With reference now to FIG. 10, an illustration of a cross-sectional view of battery system 200 from FIG. 9 is depicted in accordance with an illustrative embodiment. In this illustrative example, a cross-sectional view of battery system 200 from FIG. 9 is depicted taken in the direction of lines 10-10.

As depicted, seals 1000, 1002, 1004, and 1006 may be positioned between casings 913, 915, 917, and 919, respectively, and wall 900 of housing 202. Seal 1000, 1002, 1004, and 1006 may be an example of one implementation for seals that may be included in number of seals 117 in FIG. 1. Seals 1000, 1002, 1004, and 1006 provide hermetic seals such that air and other types of gases are not allowed to escape through plurality of openings 901 unless one of frangible members 912, 914, 916, and 918, respectively, breaks apart. Even when one of frangible members 912, 914, 916, and 918 breaks apart, only the fluid, which may include one or more liquids, one or more gases, or some combination thereof, within the corresponding battery cell may be allowed to vent out of housing 202.

Figure 11:
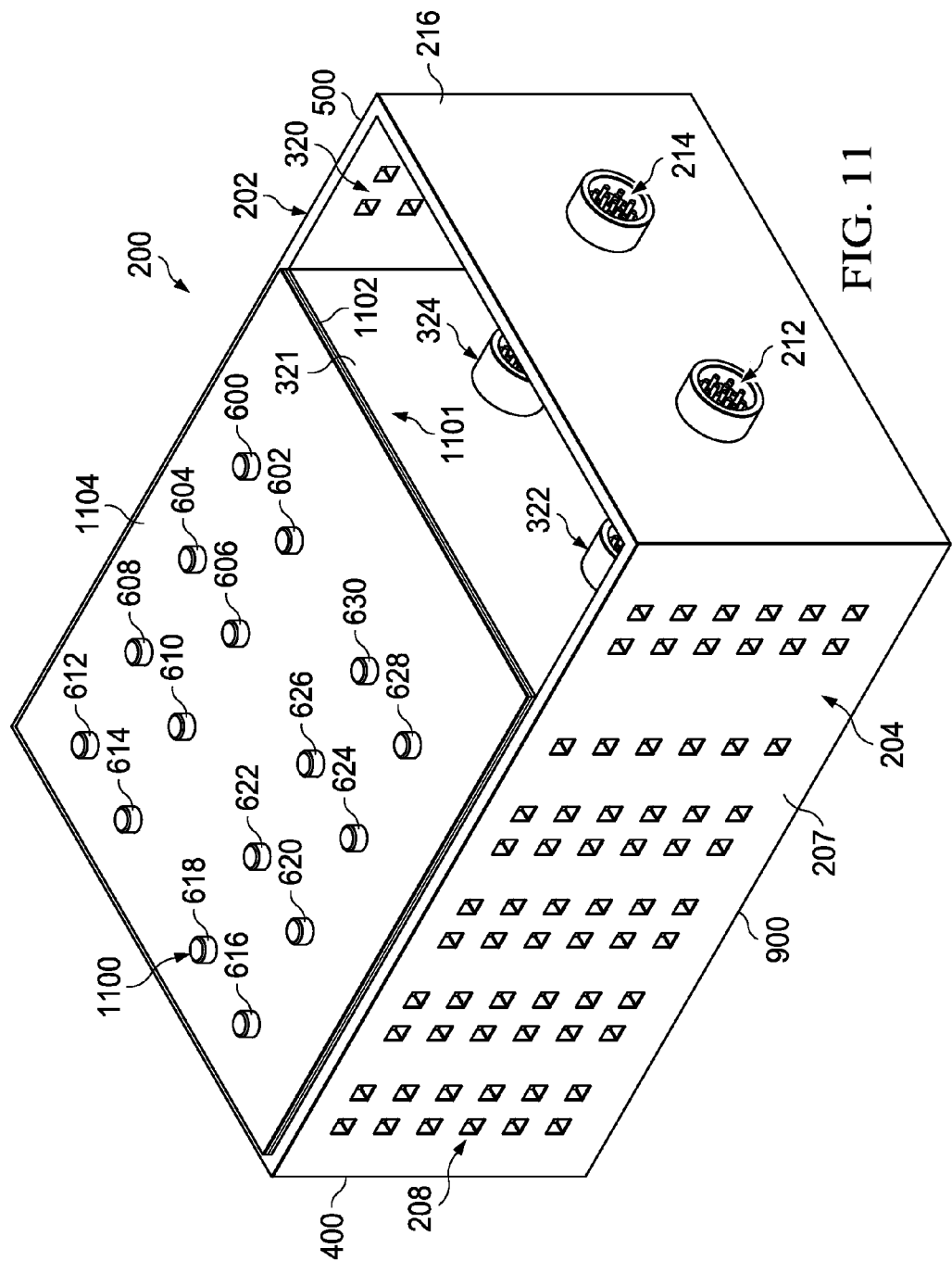
FIG. 11 is an illustration of a battery system with a terminal isolation system positioned relative to the terminals of the battery cells in the battery system in accordance with an illustrative embodiment.
Figure 12:
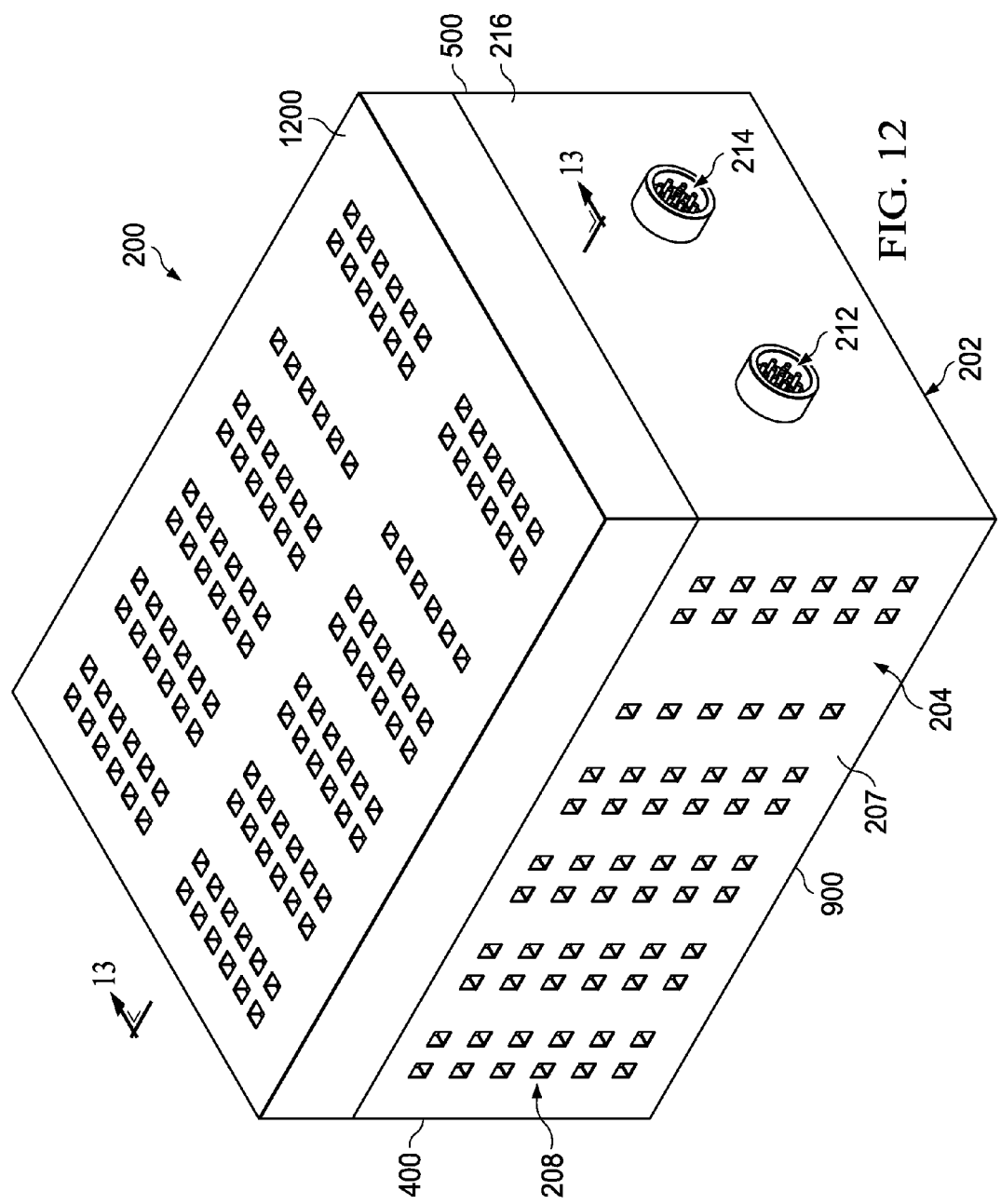
FIG. 12 is an illustration of a battery system with a lid positioned over a terminal isolation system in accordance with an illustrative embodiment.
Figure 13:
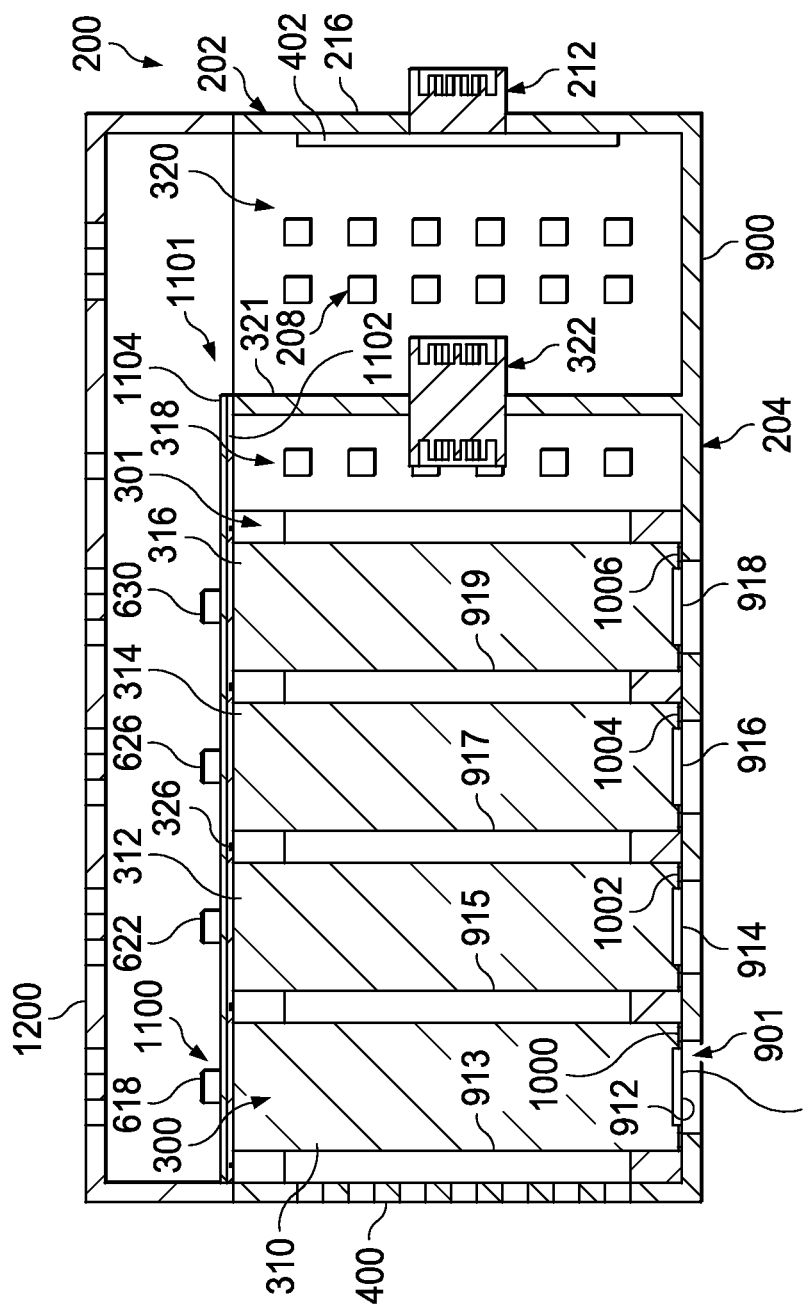
FIG. 13 is an illustration of a cross-sectional view of a battery system with a lid in accordance with an illustrative embodiment.

With reference now to FIGS. 11-13, illustrations of a different type of configuration for housing 202 of battery system 200 described in FIGS. 2-10 are depicted in accordance with an illustrative embodiment. In particular, plurality of walls 204 may be shorter in height in FIGS. 11-13 as compared to plurality of walls 204 of battery system 200 described in FIGS. 2-10.

Turning now to FIG. 11, an illustration of battery system 200 with a terminal isolation system positioned relative to the terminals of the battery cells in battery system 200 is depicted in accordance with an illustrative embodiment. In this illustrative example, walls 207, 216, 400, and 500 do not extend past plurality of terminals 1100 of plurality of battery cells 300 (not shown).

Terminal isolation system 1101 is an example of one implementation for terminal isolation system 160 in FIG. 1. Terminal isolation system 1101 includes seal 1102 and isolation plate 1104 in this illustrative example. Further, seal 1102 may be an example of one implementation for a seal included in number of seals 117 in FIG. 1.

Seal 1102 and isolation plate 1104 are positioned relative to plurality of terminals 1100 such that plurality of terminals 1100 extends past seal 1102 and isolation plate 1104 as depicted. Isolation plate 1104 may be comprised of a material that is chemically resistant, thermally resistant, electrically insulative, and capable of withstanding high temperatures.

Turning now to FIG. 12, an illustration of battery system 200 from FIG. 11 with a lid positioned over terminal isolation system 1101 in FIG. 11 is depicted in accordance with an illustrative embodiment. In this illustrative example, lid 1200 has been placed on top of plurality of walls 204 of battery system 200 from FIG. 11. Lid 1200 is an example of one implementation for lid 158 in FIG. 1.

With reference now to FIG. 13, an illustration of a cross-sectional view of battery system 200 with lid 1200 from FIG. 12 is depicted in accordance with an illustrative embodiment. In this illustrative example, a cross-sectional view of battery system 200 with lid 1200 from FIG. 12 is depicted taken in the direction of lines 13-13.

As depicted, seal 1102 and isolation plate 1104 may keep plurality of terminals 1100 hermetically isolated from battery chamber 318. This hermetic isolation may help prevent any undesired effects due to one or more of plurality of battery cells 300 not operating within selected tolerances.

Figure 14:
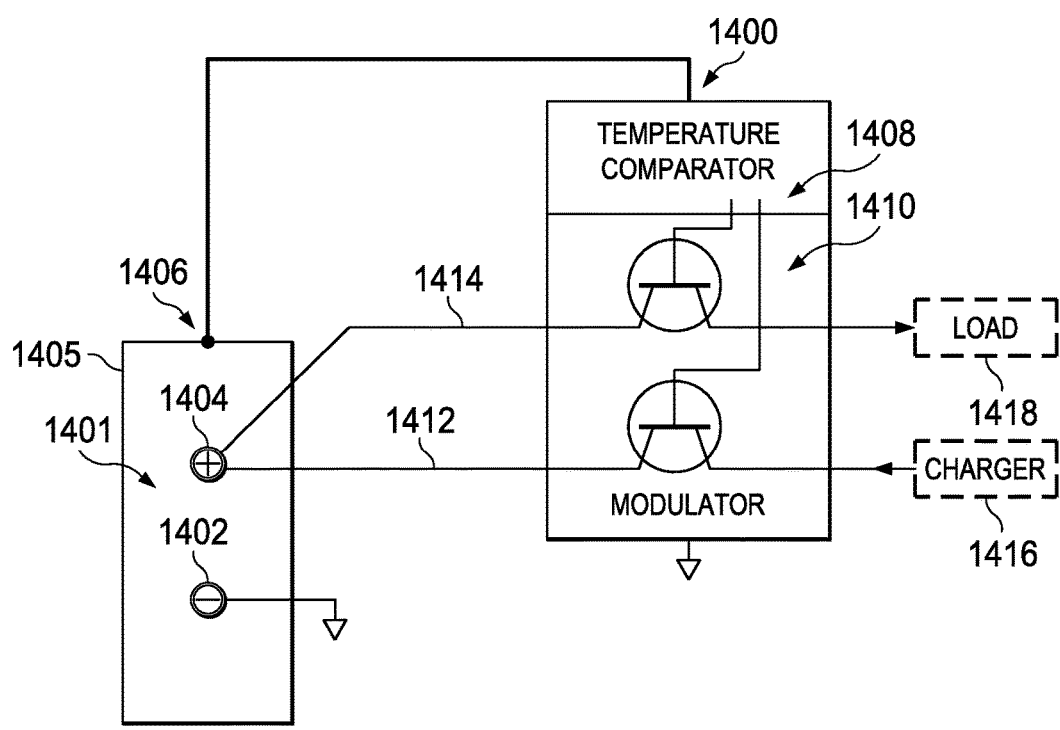
FIG. 14 is an illustration of a current modulation device connected to a battery cell in accordance with an illustrative embodiment.

With reference now to FIG. 14, an illustration of a current modulation device connected to a battery cell is depicted in accordance with an illustrative embodiment. Current modulation device 1400 is connected to battery cell 1401 such that current modulation device 1400 corresponds to battery cell 1401. Current modulation device 1400 and battery cell 1401 may be examples of implementations for current modulation device 144 and battery cell 124, respectively, in FIG. 1.

As depicted, battery cell 1401 includes anode 1402, cathode 1404, and casing 1405, which may be examples of implementations for anode 127, cathode 128, and casing 125, respectively, in FIG. 1. Current modulation device 1400 includes temperature sensor 1406, temperature comparator 1408, and modulator 1410, which may be examples of implementations for temperature sensor 145, temperature comparator 146, and modulator 148, respectively, in FIG. 1.

Temperature sensor 1406 is used to measure the temperature of casing 1405 of battery cell 1401. In this illustrative example, temperature sensor 1406 is a thermocouple. Temperature comparator 1408 is used to determine whether the temperature measured for casing 1405 is outside of selected tolerances. In other words, temperature comparator 1408 may determine whether the temperature measured is greater than a maximum temperature threshold or lower than a minimum temperature threshold.

Modulator 1410 modulates at least one of input current 1412 or output current 1414 in response to a determination by temperature comparator 1408 that the temperature of casing 1405 is outside of selected tolerances. Input current 1412 is the current that flows into battery cell 1401 from charger 1416 when battery cell 1401 is in a charging mode. Output current 1414 is the current that flows out of battery cell 1401 to load 1418 when battery cell 1401 is in a discharging mode.

In this manner, current modulation device 1400 may be used to regulate the temperature of casing 1405 by modulating at least one of input current 1412 or output current 1414. In some illustrative examples, a current modulation device implemented in a manner similar to current modulation device 1400 may be used with each of plurality of battery cells 300 in FIGS. 3-5.

The illustrations of battery system 200 in FIGS. 2-13 and current modulation device 1400 in FIG. 14 are not meant to imply physical or architectural limitations to the manner in which an illustrative embodiment may be implemented. Other components in addition to or in place of the ones illustrated may be used. Some components may be optional.

The different components shown in FIGS. 2-14 may be illustrative examples of how components shown in block form in FIG. 1 can be implemented as physical structures. Additionally, some of the components in FIGS. 2-14 may be combined with components in FIG. 1, used with components in FIG. 1, or a combination of the two.

For example, although isolation plate 1104 and seal 1102 are depicted as two separate components in FIG. 11, seal 1102 may be formed as part of isolation plate 1104 in other illustrative examples. In other words, seal 1102 may be associated with isolation plate 1104 in some other manner. In still other illustrative examples, isolation plate 1104 may be comprised of a material that allows isolation plate 1104 to also function as a seal. For example, at least a portion of isolation plate 1104 may be comprised of a silicone material.

Figure 15:
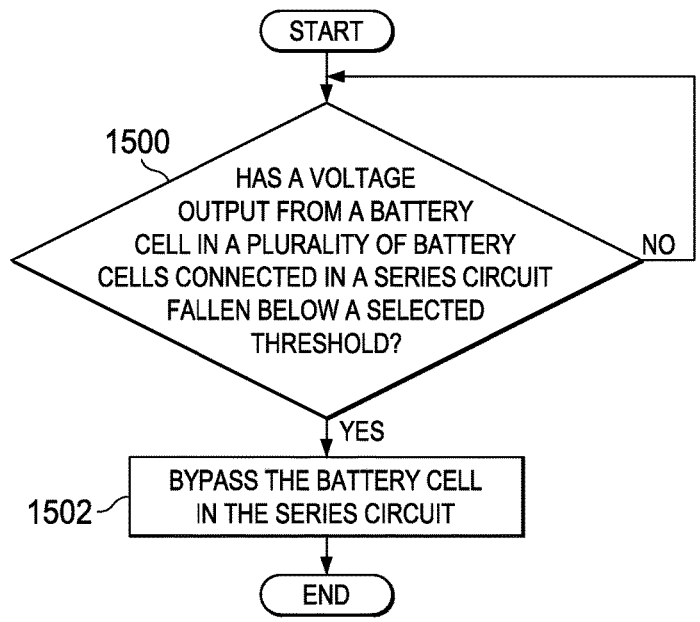
FIG. 15 is an illustration of a process for operating a battery system in the form of a flowchart in accordance with an illustrative embodiment.

With reference now to FIG. 15, an illustration of a process for operating a battery system is depicted in the form of a flowchart in accordance with an illustrative embodiment. The process illustrated in FIG. 15 may be used to operate battery system 200 in FIG. 2.

The process begins by determining whether a voltage output from a battery cell in a plurality of battery cells connected in a series circuit has fallen below a selected threshold (operation 1500). If the voltage output from the battery cell has fallen below the selected threshold, the battery cell is bypassed in the series circuit (operation 1502), with the process terminating thereafter. Otherwise, the process returns to operation 1500 as described above.

Operation 1502 may be performed by changing or controlling a switch to change from a first state to a second state. For each battery cell in the plurality of battery cells, the decision of whether or not to bypass the battery cell may be made in a manner similar to the process described in FIG. 15.

Figure 16:
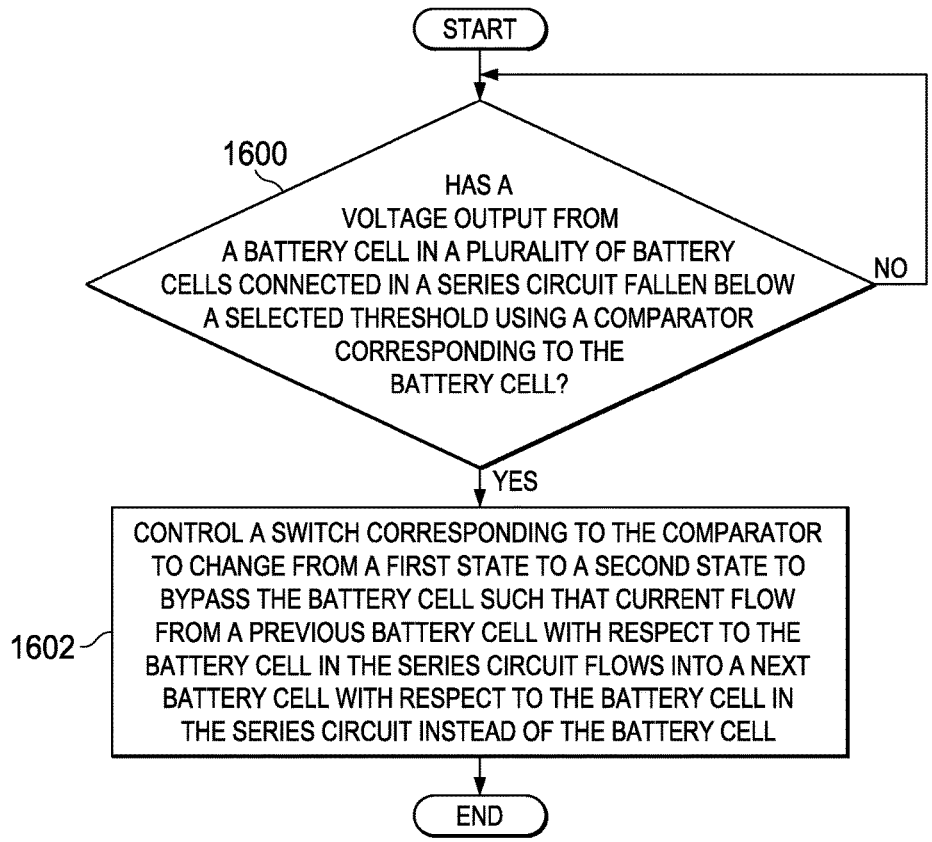
FIG. 16 is an illustration of a process for operating a battery system in the form of a flowchart in accordance with an illustrative embodiment.

With reference now to FIG. 16, an illustration of a process for operating a battery system is depicted in the form of a flowchart in accordance with an illustrative embodiment. The process illustrated in FIG. 16 may be used to operate battery system 200 in FIG. 2.

The process begins by determining whether a voltage output from a battery cell in a plurality of battery cells connected in a series circuit has fallen below a selected threshold using a comparator corresponding to the battery cell (operation 1600). If the voltage output from the battery cell has not fallen below the selected threshold, the process returns to operation 1600 as described above.

Otherwise, a switch corresponding to the comparator is controlled to change from a first state to a second state to bypass the battery cell such that current flow from a previous battery cell with respect to the battery cell in the series circuit flows into a next battery cell with respect to the battery cell in the series circuit instead of the battery cell (operation 1602), with the process then terminating. For each battery cell in the plurality of battery cells, the decision of whether or not to bypass may be made in a manner similar to the process described in FIG. 16.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a housing having a bottom wall with a plurality of openings;
    a plurality of battery cells located within a plurality of casings and connected in a series circuit within the housing and configured to supply a total voltage output, each of the plurality of casings having a frangible member, wherein each battery cell in the plurality of battery cells comprises a first terminal and a second terminal;
    a terminal isolation system comprising a seal and an isolation plate, wherein the seal forms a first surface of the terminal isolation system and the isolation plate forms a second surface of the terminal isolation system, wherein the terminal isolation system is positioned relative to the housing such that the first surface contacts the housing and the first terminal and the second terminal of each battery cell extends through the terminal isolation system;
    a plurality of seals positioned between each of the plurality of casings and the bottom wall of the housing to form a hermetic seal between the casing and the housing to prevent air and gases from escaping through one or more of the plurality of openings in the bottom wall of the housing unless one or more of the frangible members breaks apart; and
    a bypass circuit configured to determine whether a voltage output from a battery cell in the plurality of battery cells has fallen below a selected threshold and to bypass the battery cell in the series circuit in response to a determination that the voltage output from the battery cell has fallen below the selected threshold.

2. The apparatus of claim 1, wherein the bypass circuit comprises:
    a plurality of comparators, wherein a comparator in the plurality of comparators is configured to determine whether the voltage output from the battery cell has fallen below the selected threshold.

3. The apparatus of claim 2, wherein the bypass circuit further comprises:
    a plurality of switches, wherein a switch in the plurality of switches changes from a first state to a second state in response to the determination by the comparator that the voltage output from the battery cell has fallen below the selected threshold.

4. The apparatus of claim 3, wherein a previous battery cell with respect to the battery cell in the series circuit is connected to the battery cell when the switch is in the first state and wherein the previous battery cell is connected to a next battery cell with respect to the battery cell in the series circuit such that the battery cell is bypassed when the switch is in the second state.

5. The apparatus of claim 1, wherein the housing comprises:
    a plurality of walls including the bottom wall and a divider;
    a battery chamber formed by the plurality of walls; and
    a plurality of openings in the plurality of walls and configured to allow a fluid to flow from the battery chamber to an environment outside of the housing, wherein the divider forms a battery compartment and a control compartment within the housing, the battery compartment and the control compartment electrically connected by one or more connectors in the divider.

6. The apparatus of claim 5 further comprising:
    a conditioned air system configured to pump conditioned air into the battery chamber of the housing, wherein the conditioned air creates a positive pressure inside the battery chamber that causes the fluid to flow from the battery chamber to the environment outside of the housing and wherein the conditioned air is from a source other than an environment around the housing.

7. The apparatus of claim 1, wherein each frangible member is configured to break apart in response to an internal pressure within the casing rising above a selected pressure threshold such that a pressure buildup within the casing is released through the corresponding opening in the housing.

8. The apparatus of claim 1 further comprising:
    a current modulation system configured to control at least one of a current flowing into or a current flowing out of the plurality of battery cells based on a temperature of a casing of the plurality of battery cells, wherein the current modulation system is located in a control compartment with the housing formed by a divider that separates the control compartment from a battery compartment containing the battery cells.

9. The apparatus of claim 8, wherein the current modulation system comprises:
    a plurality of temperature sensors, wherein a temperature sensor in the plurality of temperature sensors is configured to measure a temperature of a casing of a corresponding battery cell in the plurality of battery cells; and a plurality of modulators, wherein a modulator in the plurality of modulators is configured to modulate at least one of the current flowing into or the current flowing out of the corresponding battery cell in response to the temperature of the casing being outside of selected tolerances.

10. The apparatus of claim 1 further comprising:

a retaining structure configured to retain the plurality of battery cells within a fixed arrangement within the housing, wherein the retaining structure is comprised of a material that is thermally conductive to allow cooling of the plurality of battery cells and electrically insulative to keep each of the plurality of battery cells electrically isolated from other battery cells in the plurality of battery cells and from the housing.

11. A battery system comprising:

a plurality of battery cells comprising a plurality of casings and a plurality of frangible members, the plurality of battery cells connected in a series circuit and configured to supply a total voltage output, wherein each battery cell in the plurality of battery cells comprises a first terminal and a second terminal;

a housing comprising:
  a plurality of walls including a bottom wall and a divider;
  a battery chamber formed by the plurality of walls and configured to hold the plurality of battery cells;
  a plurality of openings in the bottom wall; and
  a plurality of seals positioned between bottoms of the plurality of casings, and the plurality of openings in the bottom wall;

a conditioned air system configured to pump conditioned air into the battery chamber of the housing, wherein the conditioned air creates a positive pressure inside the battery chamber that causes a fluid to flow from the battery chamber to an environment outside of the housing;

a terminal isolation system comprising a seal and an isolation plate, wherein the seal forms a first surface of the terminal isolation system and the isolation plate forms a second surface of the terminal isolation system, wherein the terminal isolation system is positioned relative to the housing such that the first surface contacts the housing and the first terminal and the second terminal of each battery cell extends through the terminal isolation system; and a bypass circuit located in a control compartment configured to determine whether a voltage output from a battery cell in the plurality of battery cells has fallen below a selected threshold and to bypass the battery cell in the series circuit in response to a determination that the voltage output from the battery cell has fallen below the selected threshold, wherein the divider forms a battery compartment and the control compartment within the housing, the battery compartment and the control compartment electrically connected by one or more connectors in the divider.

12. The battery system of claim 11, wherein the frangible member is configured to break apart in response to an internal pressure within the casing rising above a selected pressure threshold such that a pressure buildup within the casing is released from the casing, through an opening formed in the casing by the frangible member breaking apart, and out of a corresponding opening in the housing.

13. The battery system of claim 11 further comprising:

a current modulation system configured to control at least one of a current flowing into or a current flowing out of the plurality of battery cells based on a temperature of a casing of the plurality of battery cells; wherein the current modulation system is located in a control compartment with the housing formed by a divider that separates the control compartment from a battery compartment containing the battery cells.

14. A method for operating a battery system, the method comprising:

separating a battery compartment within a housing from a control compartment within the housing by a divider having at least one connector;

determining, by a circuit board in the control compartment, whether a voltage output from a battery cell in a plurality of battery cells connected in a series circuit within the battery compartment of the housing has fallen below a selected threshold;

positioning a terminal isolation system relative to the housing such that a first surface of the terminal isolation system contacts the housing and a first terminal and a second terminal of each battery cell in the plurality of battery cells extends through the terminal isolation system, wherein a seal forms the first surface and an isolation plate forms a second surface of the terminal isolation system;

bypassing the battery cell in the series circuit in response to a determination that the voltage output from the battery cell has fallen below the selected threshold; and positioning a seal between a casing of the battery cell, a frangible member in a bottom of the casing, and an opening in a bottom wall of a housing.

15. The method of claim 14, wherein bypassing the battery cell comprises:

controlling a switch to change from a first state to a second state in response to the determination that the voltage output from the battery cell has fallen below the selected threshold, wherein a previous battery cell with respect to the battery cell in the series circuit is connected to the battery cell when the switch is in the first state and wherein the previous battery cell is connected to a next battery cell with respect to the battery cell in the series circuit such that the battery cell is bypassed when the switch is in the second state.

16. The method of claim 14 further comprising:

creating a positive pressure inside a battery chamber within the housing configured to hold the plurality of battery cells using conditioned air such that a fluid flows from the battery chamber to an environment outside of the housing through a plurality of openings in a plurality of walls of the housing.

17. The method of claim 14 further comprising:

breaking apart the frangible member associated with a casing of the battery cell in response to an internal pressure of the battery cell rising above a selected pressure threshold; and releasing a pressure buildup through an opening in the casing created by the frangible member breaking apart and through a corresponding opening in the housing.

18. The method of claim 14 further comprising:

controlling at least one of a current flowing into or a current flowing out of each of the plurality of battery cells based on a temperature of a casing of the each of the plurality of battery cells.

19. The method of claim 18, wherein controlling the at least one of the current flowing into or the current flowing out of the each of the plurality of battery cells comprises:
    measuring the temperature of the casing of the battery cell; and
    modulating at the least one of the current flowing into or the current flowing out of the battery cell in response to the temperature of the casing being outside of selected tolerances.

* * * * *